Nov. 14, 1967 R. H. CARLSON 3,352,190
FASTENER HAVING EXTRUDED DRIVING HEAD
Filed Feb. 7, 1966

RAYMOND H. CARLSON
INVENTOR
BY
BUCKHORN, BLORE, KLARQUIST & SPARKMAN
ATTORNEYS

United States Patent Office 3,352,190
Patented Nov. 14, 1967

3,352,190
FASTENER HAVING EXTRUDED DRIVING HEAD
Raymond H. Carlson, Rockford, Ill., assignor to Textron Industries, Inc., Rockford, Ill., a corporation of Delaware
Filed Feb. 7, 1966, Ser. No. 525,564
2 Claims. (Cl. 85—9)

ABSTRACT OF THE DISCLOSURE

A serrated-head fastener is provided with a reversely extruded driving head defined on its outer perimeter by a multiplicity of alternating, convexly curved ribs and intermediate, concavely curved flutes, the ribs being work-hardened due to the reverse extrusion of said head; the major diameter across the ribs being less than the crest diameter of the threads and the minor diameter across the flutes being greater than the root diameter of the threads.

---

This invention relates to serrated-head fasteners, for example those commonly known as 12-point fasteners, and to a method of making such fasteners.

Serrated-head fasteners are well known. The heads of such fasteners, however, have heretofore been made with sharply pointed V-shaped serrations which are incapable of developing a large amount of torque, and thus the heads have had to have a major diameter considerably larger than the pitch diameter of the shank in order to deliver enough torque fully to utilize the thread thereon. This, of course, has resulted in a heavy fastener, and one which is uneconomical to manufacture because of the excess material consumed. Furthermore, such fasteners have heretofore required at least two steps in order to make them, the step of first forming an enlarged head or bloom on the workpiece, and then the step of forming serrations on this enlarged head. In a punch and die operation, this has always required at least two blows.

It is thus an object of the present invention to provide a serrated-head fastener that will be lighter in weight and more economical to manufacture than those heretofore known.

It is a further object of the present invention to provide such a fastener having a serrated head smaller than those heretofore known, which head will be large enough and strong enough, however, to provide the requisite amount of torque to utilize the thread on the shank.

It is a still further object of the present invention to provide an economical method of making such serrated-head fasteners.

It is a still further object of the present invention to provide such a method in which the fastener head can be made in a single stroke of a punch driven against the end of a cylindrical workpiece of constant diameter mounted within a holding die.

In accordance with these objects, the fastener of the present invention comprises an externally serrated head and an elongated threaded shank. The head is formed in a single blow in which it is reversely extruded and whereby the perimeter is provided with a series of alternating, convexly curved ribs and intermediate, concavely curved flutes, the ribs being work-hardened by the extrusion of said head. During the extrusion, the head is provided with a major diameter substantially equal to the pitch diameter of said threaded shank and therefore less than the crest diameter of the thread. The minor diameter of the serrated head is greater than the root diameter of the threaded shank. Due to the work-hardened condition of the ribs, the head when driven by a cooperating wrench of complementary shape will fully withstand the transmission of driving torque at least as great as the torque which can be withstood by the threadd shank portion. At the same time, the size of the head is maintained substantially equal to the diameter of the original workpiece with considerable saving in weight and in material required.

The method of my invention comprises the steps of preparing a cylindrical blank workpiece of constant diameter which is equal to the pitch diameter of the threaded shank, enclosing the workpiece in the cavity of a die with a portion of the workpiece protruding therefrom, and striking the protruding portion of the workpiece a single blow with a punch. The punch has an interior cavity the periphery of which comprises a series of alternating convex and concave ribs and grooves equally spaced and tangentially merging with each other, the major diameter of the interior cavity being substantially equal to the diameter of the workpiece. The minor diameter of the punch cavity is slightly less than the diameter of the workpiece. The externally serrated head that is thus formed on the protruding portion of the workpiece has flutes and crests corresponding to the convex and concave arcuate surfaces of the interior cavity of the punch, respectively.

The interior caivty of the punch is provided with a funnel-shaped opening, the diameter of which is greater than the diameter of the workpiece, thereby to facilitate the passage of the punch over the protruding portion of the workpiece. Since the major diameter of the interior cavity of the punch is substantially equal to the diameter of the workpiece and the minor diameter of the interior cavity is slighly less than the diameter of the workpiece, the end of the workpiece is reversely extruded in the formation of the ribs which are work-hardened during the extrusion operation. A portion of metal is upset from the workpiece to form a relatively thin integral washer on the fastener between the head and the shank.

Other objects and advantages of the invention will become apparent in the following specification, when taken in conjunction with the accompanying drawings, wherein.

Figure 1:
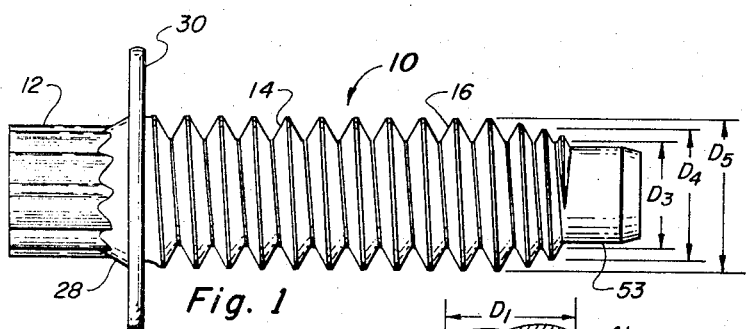
FIG. 1 is an elevational view of a serrated-head fastener made in accordance with this invention.
Figure 2:
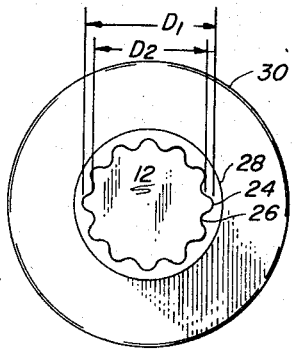
FIG. 2 is an end view of the head of the fastener of FIG. 1.

Referring to the drawings and in particular to FIGS. 1 and 2, there is shown a serrated-head fastener 10 having an externally serrated head 12 and an elongated threaded shank 14. The head 12 has a major diameter $D_1$ substantially equal to the pitch diameter $D_4$ of the threaded shank 14, and therefore somewhat less than the crest diameter $D_5$ of the thread. The minor diameter $D_2$ of the serrated head 12 is greater than the root diameter $D_3$ of the threaded shank 14. The pitch diameter $D_4$ of the threaded shank 14, of course, is substantially equal to the diameter $D_6$ of the workpiece 20 on which the threads 16 are formed. (See FIG. 3.)

As will be seen from FIG. 2, the peripheral surface of the serrated head 12 is comprised of a series of alternating arcuate convex ribs 24 and arcuate concave flutes which are equally spaced and tangentially merge with each other about the peripheral surface of the head 12.

The convex ribs 24 and concave flutes 26 terminate in a sloping conical shoulder 28. A relatively thin integral washer 30 is formed between the shoulder 28 and the shank 14. The serrated head 12 thus formed is capable of delivering a sufficient amount of torque with a complementary wrench to obtain maximum loading of the threaded portion despite the fact that the head 12 is considerably smaller than has heretofore been deemed necessary.

Figure 6:
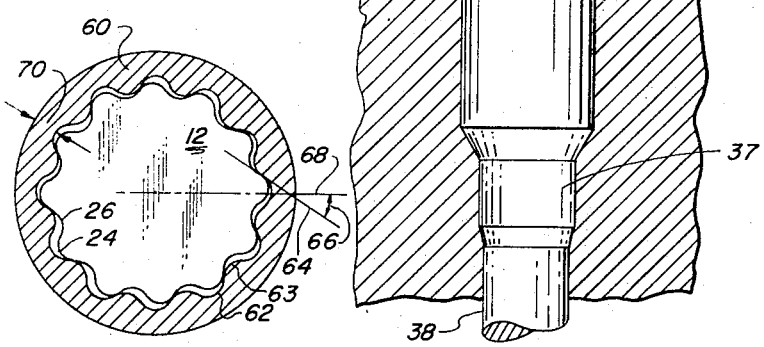
FIG. 6 is a plan view, partly in section, showing the end view of the fastener head and the cross section of a surrounding socket wrench.

Referring now to the view of FIG. 6, the shell of a socket wrench is indicated in cross section at 60 surrounding the serrated head 12. The internal wall of the socket wrench is shown having alternating concave flutes 62 and convex ribs 63 which are generally complementary to the ribs 24 and flutes 26 of the head 12. For purposes of illustration, considerable clearance is shown between the adjacent ribs of the head and wrench, respectively, but it will be observed that the engaging surfaces of these ribs extend substantially in a plane 64 which forms an angle 66 of approximately 33 degrees with the radii 68.

In the case of conventional serrated head and complementary wrench combinations, in which the serrations are defined by relatively flat intersecting surfaces, the drive angle comparable to that indicated at 66 in FIG. 6 is much greater, such as in excess of 60 degrees. Such a large drive angle imposes a severe load upon the wrench which, accordingly, must be designed with sufficient wall thickness to withstand the stress imposed thereupon. With a reduced drive angle such as indicated herein, the thickness of the wall of the socket wrench indicated at 70 may be reduced very substantially. Moreover, on account of the fact that the bottoms of the flutes formed in the socket are rounded, high stress zones, such as are caused by V-bottom grooves, are eliminated.

Therefore, even though the overall diameter $D_1$ of the screw head is much less than in screws heretofore customarily provided, more than adequate torque can be provided by a thin walled socket wrench with less danger of failure of the screw head or the wrench than in the case of conventional serrated head types of screw and wrench combinations.

Particular attention is further directed to the fact that the root diameter $D_3$ of the thread of the shank 14 is somewhat less than the diameter $D_2$ across the bottoms of the grooves of the screw head 12, and any failure in connection with the screw will occur across the roots of the threaded portion of the screw rather than in the screw head.

Figure 3:
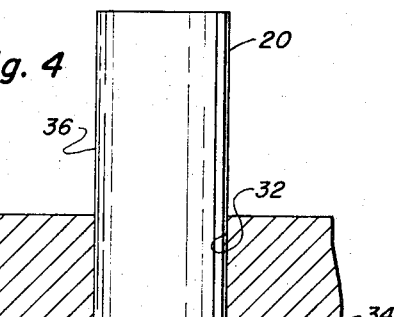
FIG. 3 is an elevational view of the initial workpiece from which the fastener of FIG. 1 is made.

The fastener 10 of FIGS. 1 and 2 is produced in the following manner in accordance with the method of this invention. A cylindrical workpiece 20 of substantially constant diameter $D_6$, such as is shown in FIG. 3, and of predetermined length is severed from a length of stock material (not shown). The diameter $D_6$ is desirably that of the shank 14 prior to threading, so that the diameter of the workpiece will be substantially equal to the pitch diameter $D_4$ of the threaded shank 14, as will be well known to those skilled in the art. Preferably, the volume of the workpiece 20 is made substantially equal to the volume of the fastener 10.

After severing the workpiece 20, it is placed in the cavity 32 of a holding die 34 with a portion 36 of the workpiece protruding from the die.

Positioned above the die 34 is a punch 40, which has an interior cavity 42 formed in a manner to shape the head 12. As such, the periphery of the cavity 42 comprises a series of alternating arcuately curved convex ribs and concave flutes equally spaced and tangentially joined to each other. The major diameter of the cavity 42 is, of course, equal to the major diameter $D_1$ of the head 12 and is substantially equal to the diameter $D_6$ of the workpiece 20. The minor diameter of the cavity 42 is, of course, made equal to the minor diameter $D_2$ of the serrated head 12, and is thus slightly less than the diameter of the workpiece 20. A single stroke of the punch 40 will thus form the finished head 12 on the protruding portion 36 of the workpiece.

The cavity 42 of the punch 40 is provided with an outwardly flared entrance 44 to facilitate the passage of the punch 40 over the protruding portion 36.

In view of the fact that the major diameter of the cavity 42, that is, as measured between the bottoms of diametrically opposite grooves, is substantially equal to the diameter $D_6$ of the workpiece, the end portion of the workpiece will be extruded upwardly into the cavity 42 until it engages the end of the knock-out pin 41. The convex ribs 24 and flutes 26 will be fully and accurately formed because little or no outward flow of metal is required for the perfect formation of such ribs, while at the same time the ribs will be work hardened due to the extrusion which takes place. The end surface of the knock-out pin forms the bottom of the punch cavity 42 and also facilitates the withdrawal of the punch 40 from the end of the workpiece following the formation of the head 12.

Figure 4:
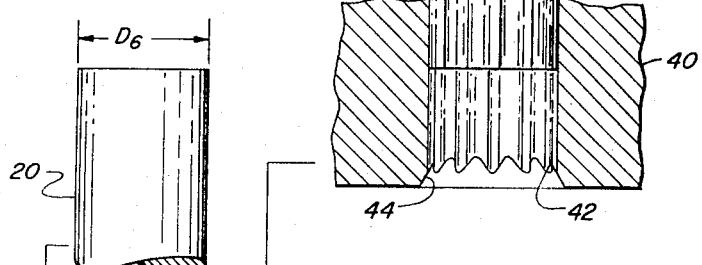
FIG. 4 is a sectional view showing the die with the workpiece placed therein and the punch in position to strike the head-forming blow.
Figure 5:
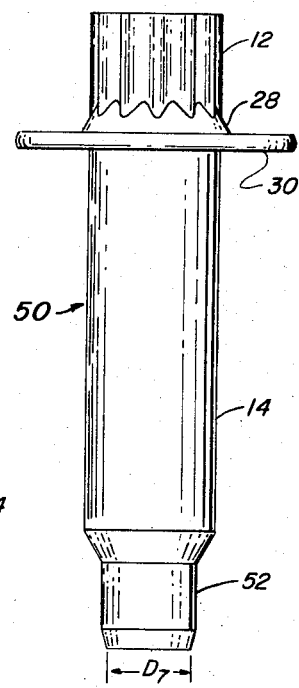
FIG. 5 is an elevational view of the fastener of the present invention after the head has been formed thereon and prior to forming the thread.

The fact that the ribs 24 are formed by an extrusion operation, rather than being formed by a broaching operation contributes materially to the strength thereof, thereby enabling the reduction in the overall size of the head to the present minimum. During the continued downward movement of the punch 40, as viewed in FIG. 4, washer 30 is formed, the metal needed for the washer coming from an additional length of workpiece specifically provided for that purpose. In other words, the punch 40 also upsets a portion of the workpiece between the lower surface of the punch 40 and the upper surface of the die 34, as viewed in FIG. 4, sufficient to form the washer 30. Since reduction of weight of the finished article to a minimum without impairment of strength or utility is one of the objects of the present invention, the washer 30 is preferably made relatively thin and flat. As viewed in FIG. 5, the upper surface of the washer 30 is parallel to the lower surface over the greater part of the outward or radial extent of the washer from the base of the serrated head and has an outside diameter substantially twice that of the head 12. The serrated head 12, the fillet 28, and the integral washer 30 are thus formed by means of a single stroke of the punch, the funnel-shaped opening 44 forming the fillet 28 as the opening guides the punch down onto the protruding portion 36. The fastener blank 50 thus formed is shown in FIG. 5, the shank 14 being readily adapted for the thread 16 to be rolled thereon.

If desired, the blank 50 may be provided with a lead point, such as is illustrated at 52. Such a lead point sometimes facilitates the assembly of the fastener and is illustrated in the finished screw in FIG. 1 at 53. The diameter $D_7$ of the lead point 52 is preferably no greater than the root diameter $D_3$ of the thread provided on the shank. Such a lead point can be formed on the blank during the heading operation, the bottom of the cavity in the die 34 being provided with a correspondingly reduced diameter extension 37. The die 34 is also shown being provided with a knock-out pin 38, the end of which serves as a bottom wall of the cavity extension 37.

While I have described my invention with respect to the manufacture of one particular embodiment, it is of course to be understood that the invention permits numerous modifications in arrangement and detail. I therefore claim as my invention all such modifications which come within the true spirit and scope of the following appended claims.

I claim:
1. A fastener device including an elongate, threaded shank portion and:
   (a) a longitudinally extruded driving head at one end of said shank portion;
   (b) the perimeter of said head being defined by a multiplicity of alternating, convexly curved ribs and intermediate, concavely curved flutes;

(c) said ribs being work-hardened by the extrusion of said head;
(d) the major diameter across said ribs being substantially equal to the pitch diameter of said threaded shank and less than the crest diameter of the threads on said shank;
(e) the minor diameter across said flutes being greater than the root diameter of the threads on said shank whereby said ribbed head has a torsional strength greater than that of the threaded portion of said fastener.

2. A fastener device as in claim 1 which is further provided with an integral washer portion between said ribbed head and said shank portion;
  (a) said washer portion having substantially parallel upper and lower surfaces,
  (b) a conical shoulder between the upper surface of said washer portion and the ribbed surface of said head,
  (c) said washer portion having an outside diameter substantially double the outside diameter of said ribbed head portion.

References Cited
UNITED STATES PATENTS

| | | | |
|---|---|---|---|
| 2,248,695 | 7/1941 | Bradshaw | 85—45 |
| 3,290,982 | 12/1966 | Marschner | 85—1 |

FOREIGN PATENTS 750,894   6/1956   Great Britain.

CARL W. TOMLIN, *Primary Examiner.*
R. S. BRITTS, *Assistant Examiner.*